Feb. 22, 1927. 1,618,528
D. GRILL
STORAGE BATTERY COVER
Filed Feb. 14, 1925
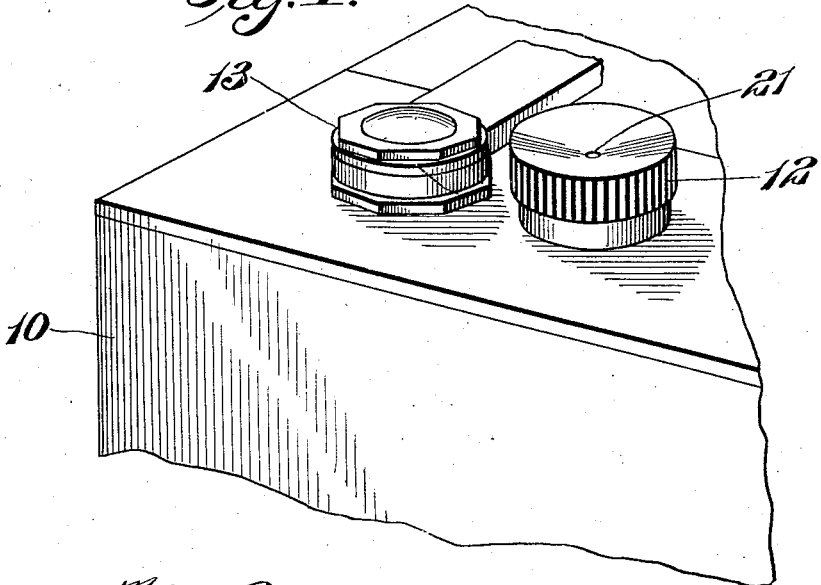
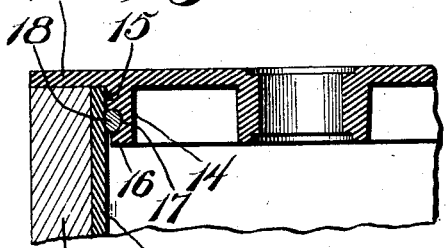
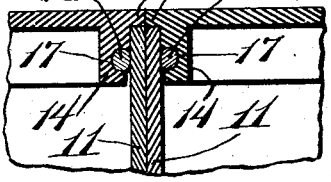
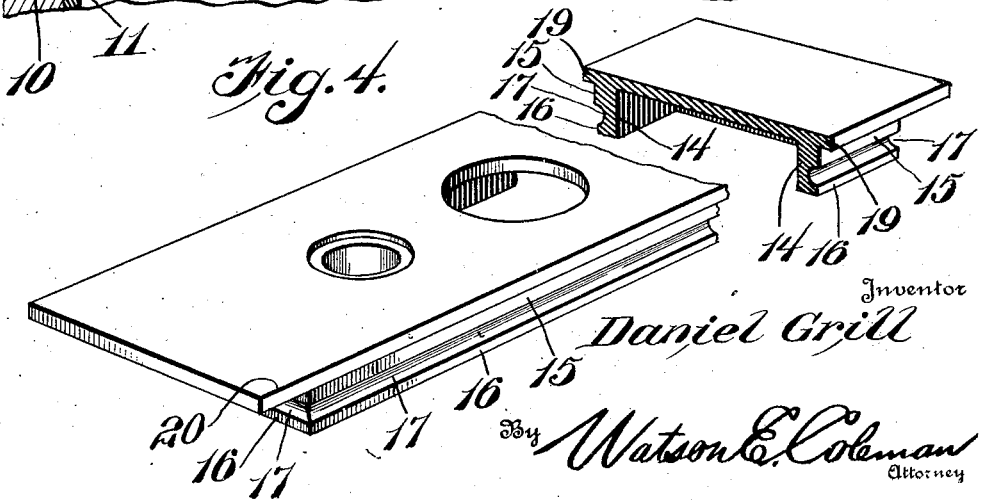
Inventor
Daniel Grill
By Watson E. Coleman
Attorney Patented Feb. 22, 1927.

1,618,528

UNITED STATES PATENT OFFICE.

DANIEL GRILL, OF ROANOKE, VIRGINIA.

STORAGE-BATTERY COVER.

Application filed February 14, 1925. Serial No. 9,133.

This invention relates to storage batteries and more particularly to the construction of the covers thereof.

An important object of the invention is to provide a cover which may be brought into sealing engagement with the jar without the necessity of employing sealing compounds of any character.

A further object of the invention is to provide a cover constructed so that the box of the battery is protected against the action of acids and fumes particularly as regards the upper surface of such box.

A further object of the invention is to provide a device of this character which, when employed in combination with a battery unit mounting such as is described in my Patent No. 1,580,596, granted Apr. 13, 1926, for storage batteries, will afford a complete seal both between the jar and the cover and the cover and the battery post against the leakage of acid or fumes without employing a sealing compound therewith.

These and other objects I attain by the construction shown in the accompanying drawings, wherein for the purpose of illustration is shown a preferred embodiment of my invention and wherein:—

Figure 1 is a fragmentary perspective view of a battery embodying covers constructed in accordance with my invention and shown as having applied thereto a link mounting constructed in accordance with the application above mentioned;

Figure 2 is a transverse sectional view showing the construction of the cap where the associated wall of a battery jar upon which the cap is applied abuts against the wall of the battery box;

Figure 3 is a view showing the construction of the cap where the associated wall of the jar to which the cap is applied abuts a second jar, and Figure 4 is a perspective of the cover removed, a portion of the cover being broken away to show the construction thereof.

Referring now more particularly to the drawings, the numeral 10 generally indicates a battery box wall and 11 the side walls of the open top jars employed within the box for the reception of the battery elements. In accordance with my invention, a cover is provided upon which the usual provision is made for a vent cap 12 and battery link connector and post mounting indicated at 13. This cover embodies a depending flange 14 extending into and closely fitting the inner face of the side wall 11 of the battery jar at its upper portion 15 and having a lower portion 16 so formed that it loosely engages within the battery jar and opposes the walls of the battery jar in spaced relation thereto. Between these upper and lower portions of the flange, the outer surface of the flange is formed with a continuous groove 17 in which is seated a gasket 18 of soft rubber or other suitable material. This gasket will, of course, be of such size that it will be compressed in the operation of inserting the flange of the cover into the upper end of the battery jar and will afford a sealing engagement between the flange and battery jar.

The side edges of the cover project beyond the depending flange to form side wall flanges 19 and 20. Where the wall of the jar to which the flange 14 is opposed abuts a second battery jar as in Figure 3, the flanges 19 are employed and are of the same width as the thickness of the battery jar so that they do not project beyond the side edges of this battery jar and a neat joint will be formed beneath the covers. Where the portion of the jar opposed by the flange 14 is opposed to the box wall 10, the flanges 20 are employed and these flanges are of a width equal to the combined thicknesses of the battery jar wall 11 and the wall 10 of the box. The appearance of a complete battery equipped with covers of this character may be determined by an inspection of Figure 1 from which it is seen that the entire upper edge of the box is covered by the flanges and the covers with their flanges combine to form a flat smooth surface for the upper face of the completed battery. Such a surface is readily kept clean and free from any acid accumulation such as might pass from the vent opening 21. The covers are furthermore much more easily applied and removed than the ordinary cover employing the use of a plastic seal and may be as cheaply or more cheaply produced than such covers.

Since the structure herebefore set forth is obviously capable of a slight change without materially departing from the spirit of my invention, I do not limit myself to such specific structure except as hereinafter claimed.

I claim:—

A storage battery including a box, jars arranged within the box for the reception of battery elements, and covers for said jars each including a depending flange fitting within the battery jar and having a gasket abutting the opposed face of the battery jar, said flange having upper and lower portions, the upper portion closely interiorly fitting the jar, the lower portion being spaced from the wall of the jar and opposing the same, said flange having a groove intermediate said upper and lower portions for the reception of said gasket.

In testimony whereof I hereunto affix my signature.

DANIEL GRILL.